(12) United States Patent
Hayashi et al.

(10) Patent No.: US 9,955,045 B2
(45) Date of Patent: Apr. 24, 2018

(54) READING APPARATUS, READING CONTROL METHOD, AND READING CONTROL PROGRAM

(71) Applicant: Konica Minolta, Inc., Chiyoda-ku, Tokyo (JP)

(72) Inventors: Kenichi Hayashi, Hino (JP); Katsunori Takahashi, Hachioji (JP); Takashi Nara, Kawagoe (JP); Takahiro Yokoya, Tama (JP); Tatsuhiro Noutomi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/342,630

(22) Filed: Nov. 3, 2016

(65) Prior Publication Data

US 2017/0134617 A1    May 11, 2017

(30) Foreign Application Priority Data

Nov. 10, 2015  (JP) ................................ 2015-220654

(51) Int. Cl.
*H04N 1/60* (2006.01)
*H04N 1/00* (2006.01)
*H04N 1/64* (2006.01)

(52) U.S. Cl.
CPC ....... *H04N 1/6041* (2013.01); *H04N 1/00803* (2013.01); *H04N 1/6027* (2013.01); *H04N 1/646* (2013.01); *H04N 2201/0094* (2013.01)

(58) Field of Classification Search
CPC ............. H04N 1/6041; H04N 1/6044; H04N 1/00803; H04N 1/6027; H04N 1/646; H04N 2201/0094; H04N 2201/0077; H04N 2201/0091; H04N 2201/0082
See application file for complete search history.

(56) References Cited

FOREIGN PATENT DOCUMENTS

| JP | 2000-039747 A | 2/2000 |
|---|---|---|
| JP | 2006-251652 A | 9/2006 |

*Primary Examiner* — Christopher D Wait
(74) *Attorney, Agent, or Firm* — Buchanan Ingersoll & Rooney PC

(57) ABSTRACT

A reading apparatus configured to read a plurality of colorimetric patches in different colors formed on a paper sheet and trigger patches formed so as to correspond to the colorimetric patches includes: a colorimeter configured to read the colorimetric patches; a trigger sensor configured to read the trigger patches; and a controller configured to control a reading region, wherein the controller has a colorimetry region determination mode in which the reading region is determined and a colorimetry adjustment mode in which the reading region is controlled, and in the colorimetry region determination mode, after the reading regions are set to states where the reading regions are gradually shifted in a reading direction, the reading results for the colorimetric patches are collected and thereafter, a region for which a state consistent with a characteristic of the colorimetric patch has been obtained as the reading result is determined as the reading region.

9 Claims, 19 Drawing Sheets

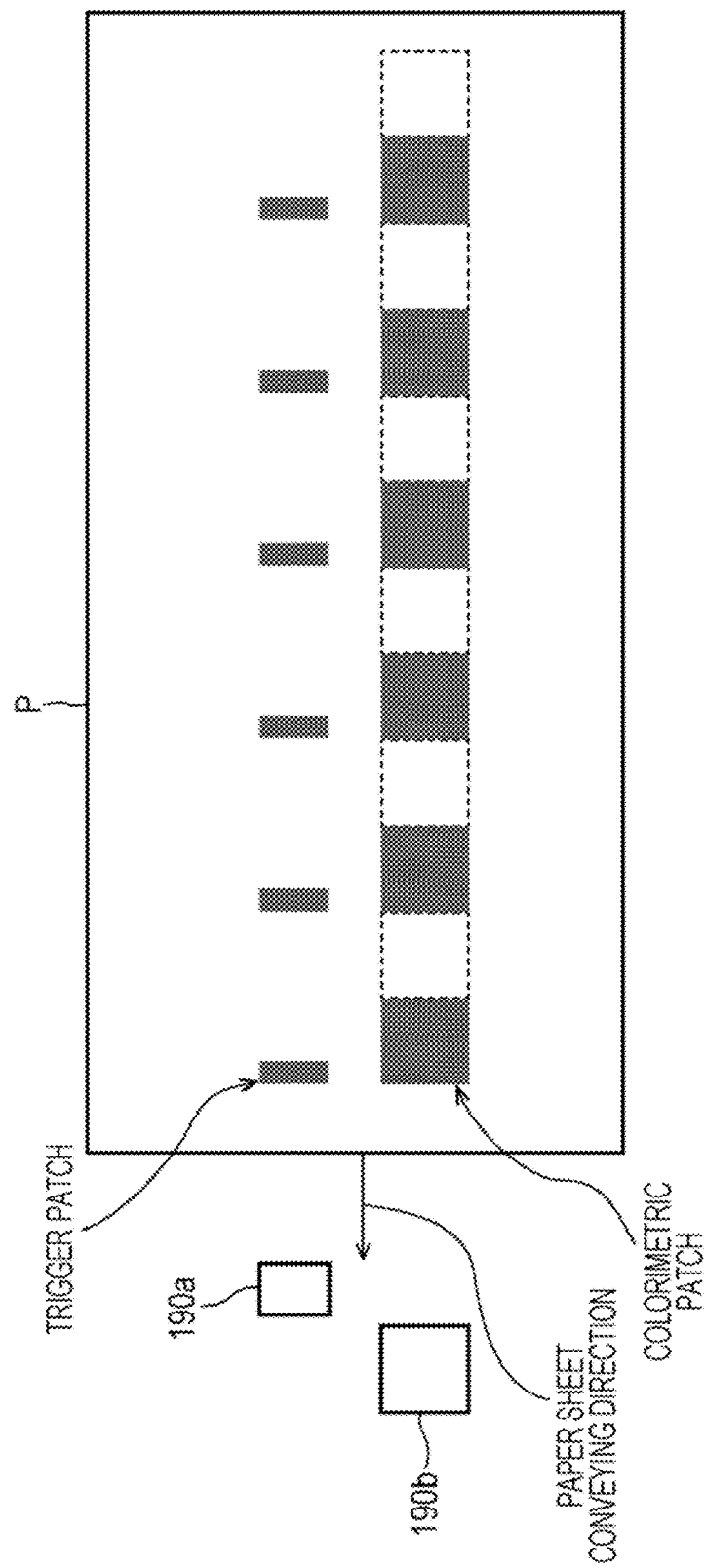

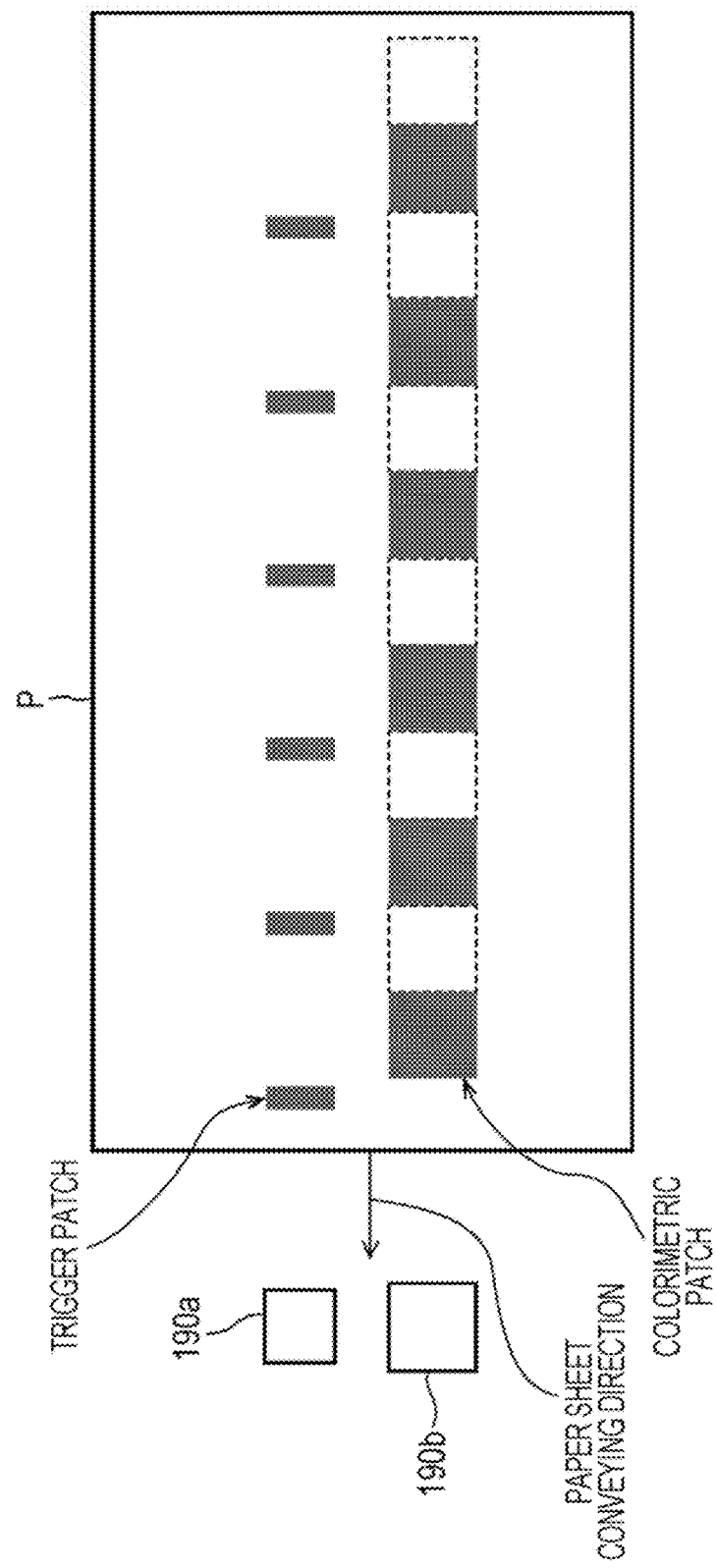

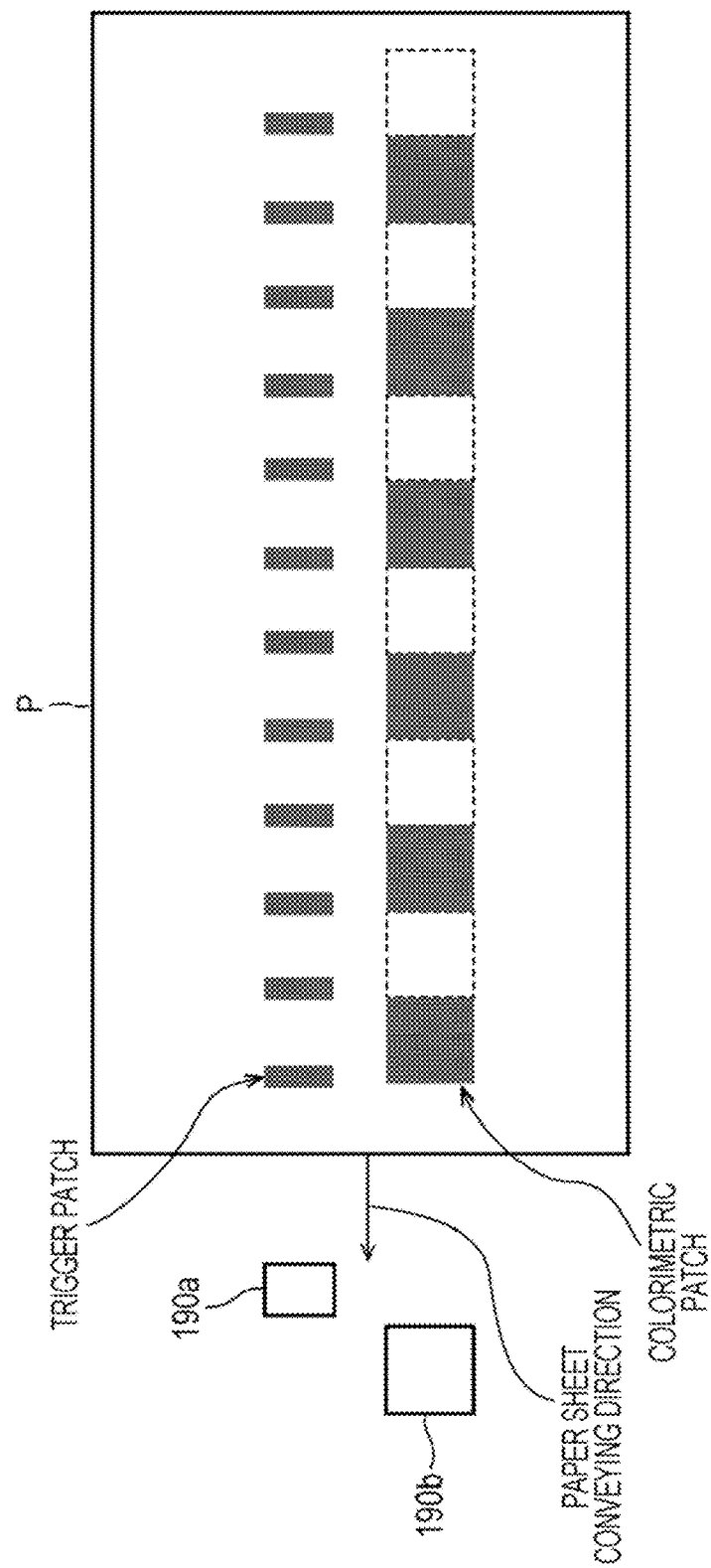

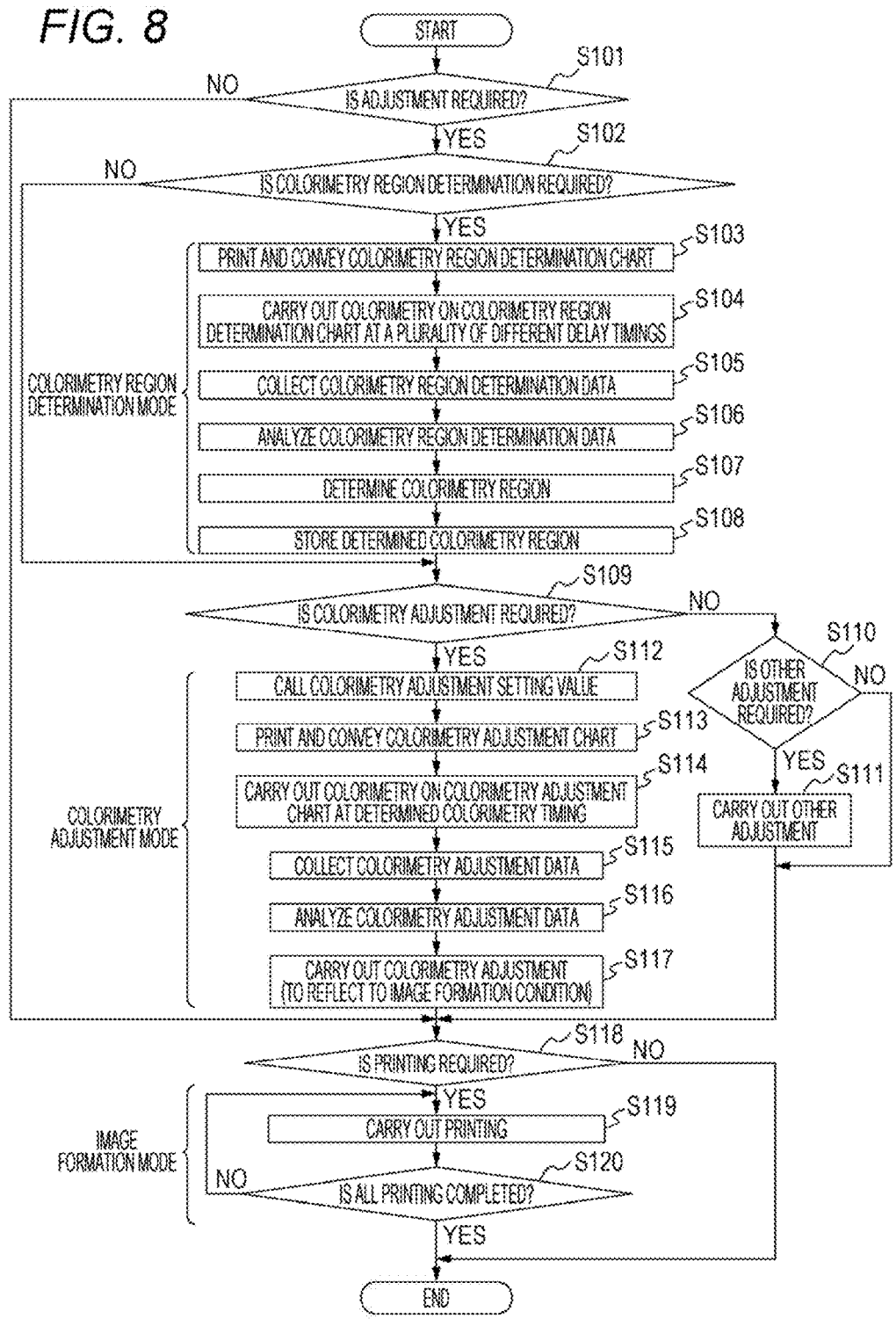

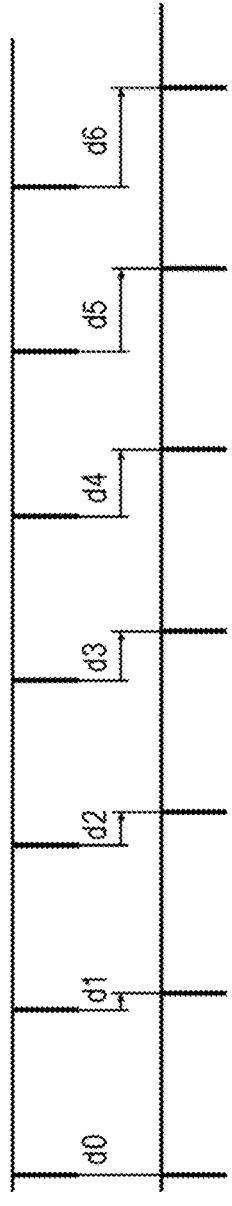
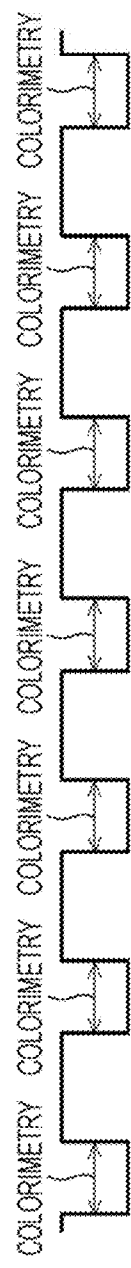
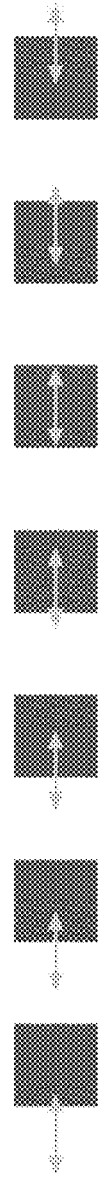
FIG. 9A
FIG. 9B
FIG. 9C
FIG. 9D
FIG. 9E

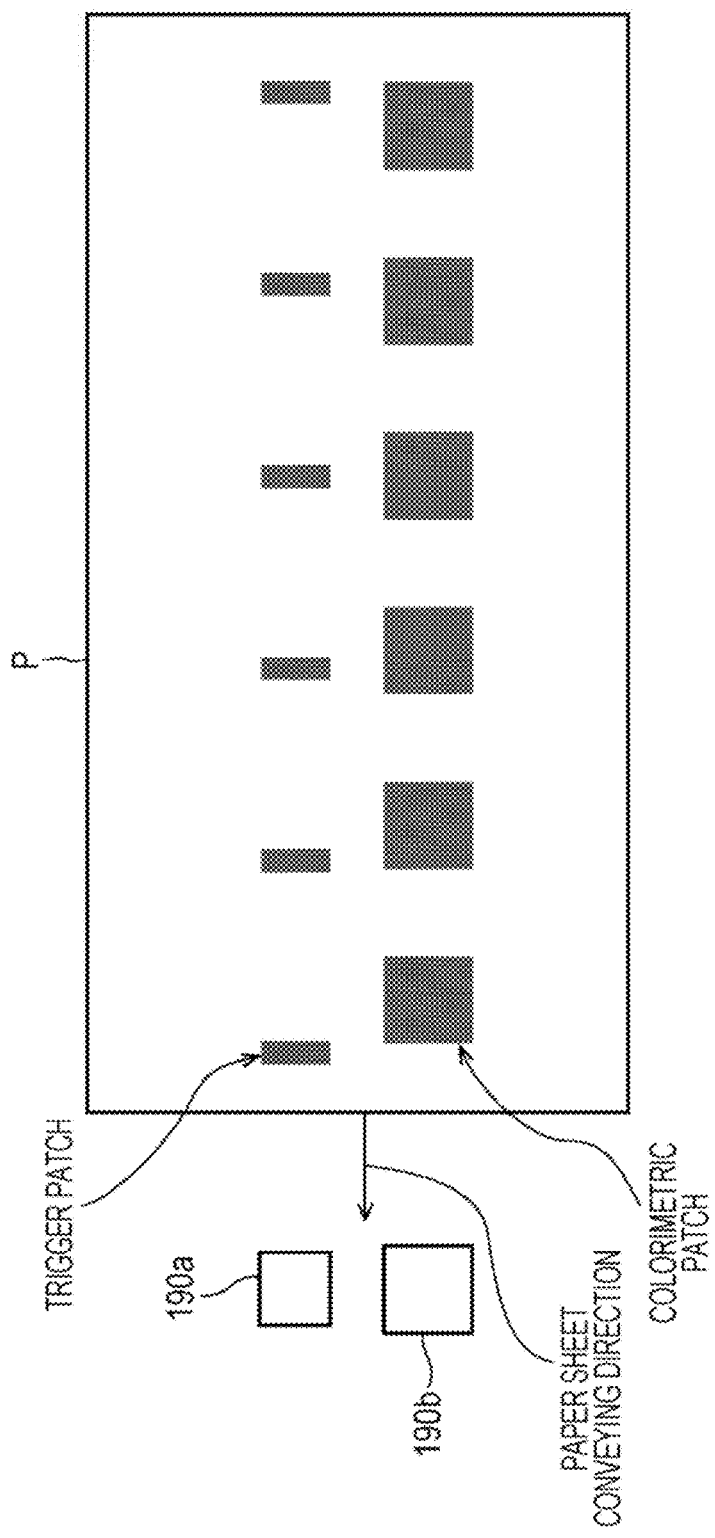

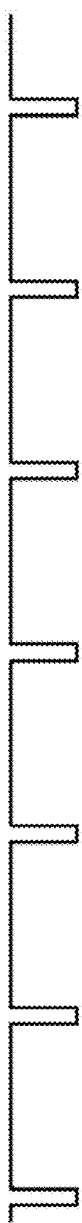
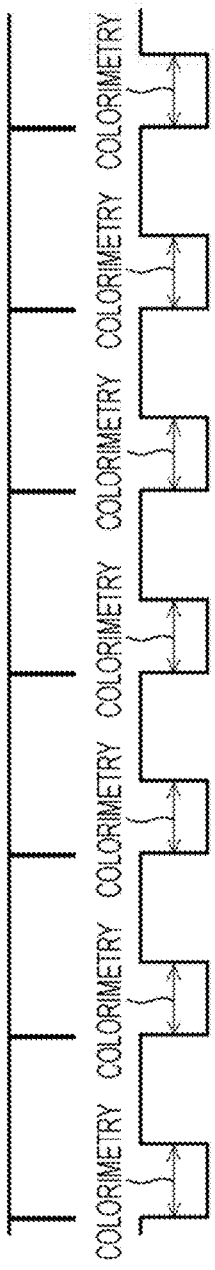
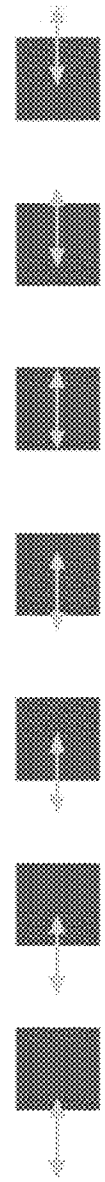
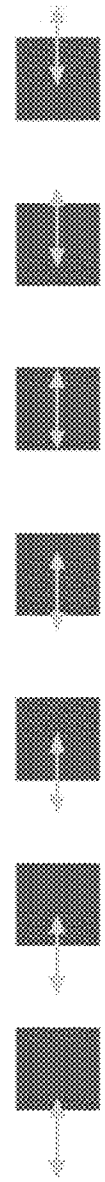
FIG. 17A
FIG. 17B
FIG. 17C
FIG. 17D

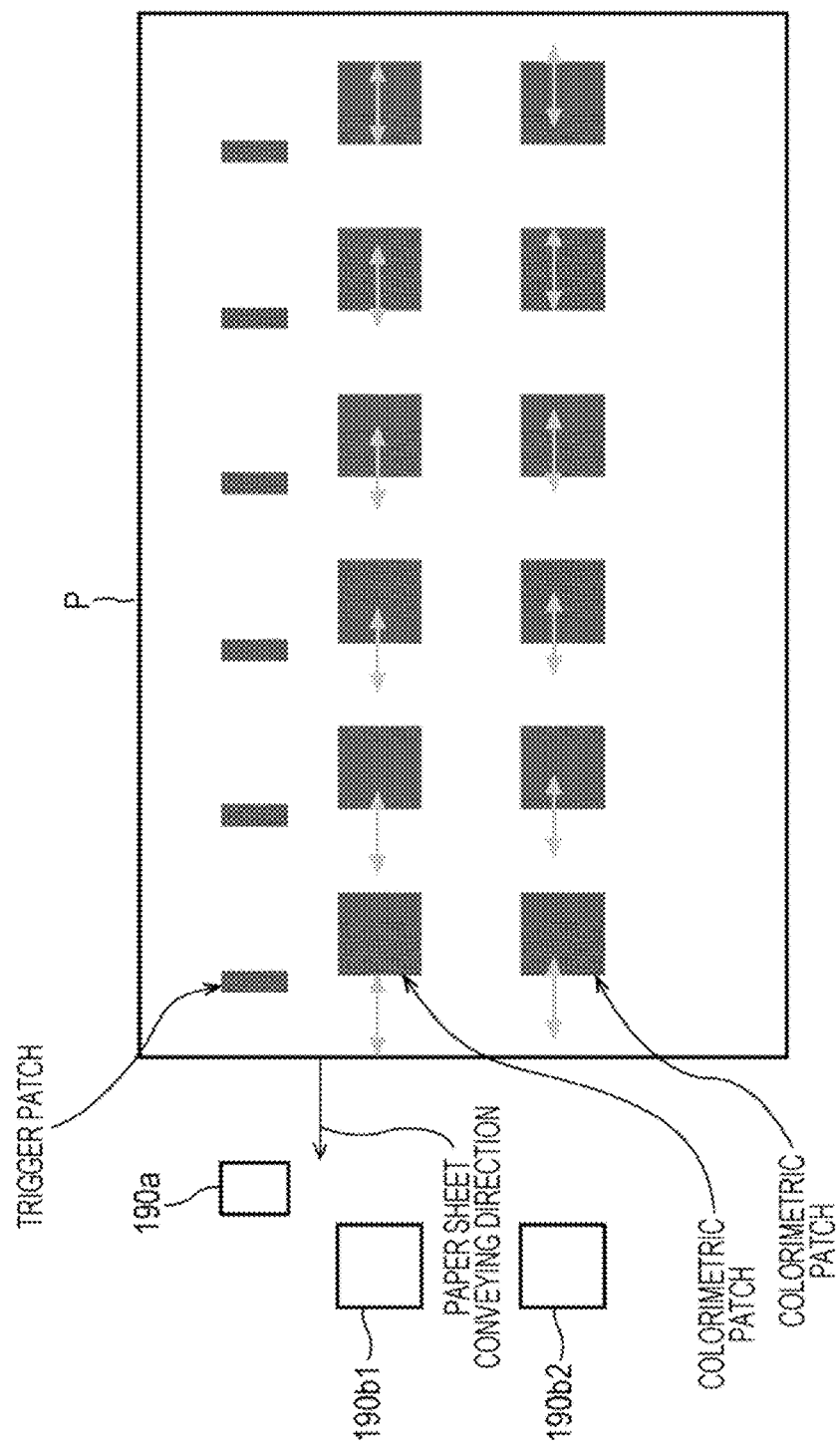

READING APPARATUS, READING CONTROL METHOD, AND READING CONTROL PROGRAM

The entire disclosure of Japanese Patent Application No. 2015-220654 filed on Nov. 10, 2015 including description, claims, drawings, and abstract are incorporated herein by reference in its entirety.

BACKGROUND OF THE INVENTION

Field of the Invention

The present invention relates to a technique of properly reading a plurality of colorimetric patches formed on a colorimetric chart when image formation is adjusted in an image formation apparatus.

Description of the Related Art

An image formation system has been known in which a reading apparatus (output object reading apparatus) is connected to a latter stage of an image formation apparatus configured to form an image on a paper sheet such that the image on the paper sheet obtained as a result of the image formation is read by the reading apparatus. Similarly, an image formation apparatus has been known in which a reading unit (output object reading unit) is arranged on a downstream side of an image formation unit configured to form an image on a paper sheet such that the image on the paper sheet obtained as a result of the image formation is read by the reading unit.

The image formation apparatus such as a printer or a multi-functional peripheral is provided with an image adjustment mode. In this image adjustment mode, in order to enhance the quality of an output image, a colorimetric patch has been conventionally printed in color to provide a function of detecting this colorimetric patch by using an RGB color density sensor or the like to compare with original print data and, when a difference therebetween is observed, correcting print density and so on while forming an image.

Preferably, in order to decrease the number of paper sheets for the adjustment, the size of the colorimetric patch to be printed on the paper sheet during such an image adjustment mode is made as small as possible with respect to a paper sheet conveying direction such that a large number of the colorimetric patches can be formed on one paper sheet.

In recent years, in order to reduce an image adjustment period or the like for further enhancement of the image quality, an image reading apparatus including an image formation apparatus equipped with an inline image scanner has appeared. This image scanner can be used to correct a position shift between a front side and a rear side of a sheet, image density, a color tone, and the like in regard to the output image in real time.

Additionally, equipping an inline spectrophotometer for accurately measuring the color tone to correct an absolute color on print data can contribute to further reduction of the adjustment period. Because the image scanner can detect the patches on the entire surface of the paper sheet, by understanding a correlation between a true color tone acquired by the spectrophotometer and color data acquired by the image scanner to correct the image scanner, the patches can be actually formed on the entire surface of the paper sheet, whereby the paper sheet for the adjustment can be saved in turn. Alternatively, when the spectrophotometer alone is connected inline to the image formation apparatus such that the colorimetry is carried out on the patch on the paper sheet while being conveyed, effects of the period reduction and so on can be achieved as a consequence of automated adjustment.

In a case where the spectrophotometer is used, a configuration is employed in which reflected light of respective components of separated light is arithmetically calculated into L*a*b* color space data or XYZ color space data, whereby the color tone is deduced. The patch for which the colorimetry is to be carried out for a visible light source is irradiated by the spectrophotometer such that an optical spectrum of the reflected light is acquired. Additionally, in some cases, in order to exclude the influence of a fluorescent agent in the paper sheet for colorimetry and consequently obtain more accurate colorimetry, reflected light of an ultraviolet light source is acquired so as to be subjected to the arithmetic calculation.

Here, the size of a colorimetric patch P formed on a paper sheet P will be described with reference to FIG. 19. In a typical spectrophotometer, a lens unit configured to acquire the reflected light is approximately 4 mm, while a measurement diameter $\varphi$ is also approximately 4 mm on the colorimetric patch.

Accordingly, a patch size PTsize_H of the colorimetric patch is required to have 4 mm+$\alpha$ per one colorimeter with respect to a paper sheet width direction (a direction perpendicularly intersecting the paper sheet conveying direction).

In addition, with respect to a paper sheet length direction (paper sheet conveying direction), the colorimetric patch is required to have a patch size PTsize_V=$\varphi$+mv+2 mg obtained by adding a movement distance mv of the paper sheet P corresponding to a measurement period, the measurement diameter $\varphi$, and a margin mg.

The spectrophotometer is constituted by an exposure unit configured by an LED or the like, a diffraction grating configured to separate light, a CMOS sensor configured to detect the reflected light of the separated light, a signal output unit configured to output a detection result in accordance with a wavelength, and so on. The typical spectrophotometer uses the CMOS sensor or the like to collect the reflected light that has been separated in units of 10 nm in a range of 380 nm to 730 nm. Exposure by the LED or the like continues for a predetermined period during colorimetry. When the reflected light is not collected for the predetermined period, precise colorimetry cannot be achieved. In order to enhance the stability in repeated colorimetry, it is further preferable to take an integrated average of several times. The separated light reflection data obtained here is stored to a memory of the colorimeter and at the same time, subjected to arithmetic calculation processing into a colorimetric value in L*a*b* or the like. Results of these series of the processing are temporarily stored to a RAM and held until being transmitted to the reading apparatus.

Here, when a colorimetry period and the colorimetric patch on the moving paper sheet during colorimetry is considered in accordance with the typical spectrophotometer as a reference, the measurement diameter $\varphi$ needs to be 4 mm, the colorimetry period needs to be 10 ms, and an analog amount of the reflected light needs to be equal to or larger than 1.3 ms when converted to a digital value. When a conveying speed of the paper sheet is assumed as 300 mm/s, a movement amount while the colorimetry is carried out one time is found out to be approximately 3.4 mm. Accordingly, the necessary patch size at least requires 7.4 mm, where 4 mm of the measurement diameter $\varphi$ has been added. In other words, resolution for the colorimetry of the colorimetric patch is found out to be 7.4 mm in the paper sheet conveying direction.

Additionally, regarding the colorimetric patch described above, it is important to align a timing at the spectrophotometer between two adjacent colorimetric patches such that the colorimetry is carried out for each of the colorimetric patches without spanning across both of the colorimetric patches. As for techniques in this field, various types of relevant proposals are described in JP 2006-251652 A and JP 2000-39747 A.

(1) In JP 2006-251652 A, as illustrated in FIG. 20, a paper sheet conveying sensor 199 is controlled to detect a leading edge of a paper sheet while being conveyed, form a trigger signal with a predetermined timer, and carry out the colorimetry on each of colorimetric patches. In this case, due to deviations on an image formation side such as a blank space at the leading edge of the paper sheet (a distance from the leading edge of the paper sheet to the colorimetric patch) and printing magnification, a timing from the leading edge of the paper sheet to each of the colorimetric patches is to be slightly changed. Therefore, it is required to enlarge a patch size.

(2) JP 2000-39747 A employs a control approach in which a spectrophotometer judges a boundary of each of colorimetric patches by itself to start the colorimetry. In this case, a color difference (including differences in saturation and brightness) equal to or larger than a certain degree is required between respective patches. This accordingly causes a limitation on the arrangement of the colorimetric patches on a chart. In addition, an unavailable combination of the colorimetric patches has a possibility of occurring. Therefore, it is required to enlarge the colorimetric patch such that whether the boundary of each of colorimetric patches is certainly passed can be determined with ease.

(3) As illustrated in FIG. 21 and FIG. 22, another approach is also considered in which trigger patches are formed in advance so as to be synchronized with the colorimetric patches in the conveying direction on the paper sheet P such that a trigger sensor 190a detects the trigger patch and, in accordance with this detection of the trigger patch, a spectrophotometer 190b carries out the colorimetry on the colorimetric patch. In this case, the trigger patch serving as a reference point is prepared for each of the colorimetric patches and thus, it is made possible to precisely pinpoint the colorimetric patch while the colorimetry is carried out thereon almost without being affected by the blank space at the leading edge or printing magnification.

As described thus far, in the cases of (1) and (2), there has been a problem where the colorimetric patch is required to be enlarged. On the other hand, in the case of (3), the colorimetric patch is not required to be enlarged and it seems that the colorimetry can be precisely carried out on the colorimetric patch.

According to the verification by the inventors of the present application, however, it has been found that even the above-described approach (3) has problems caused during manufacturing, for example, a positional difference in the paper sheet conveying direction between the trigger sensor 190a and the spectrophotometer 190b (refer to FIG. 21) and a difference in detection directivity in the paper sheet conveying direction between the trigger sensor 190a and the spectrophotometer 190b (refer to FIG. 22).

For a remedy for this, a calibration is required in such a manner that, for example, a position where the trigger sensor is activated is measured with a scale while the trigger patch is moved in units of 0.1 mm and recorded for each of the sensors; thereafter, on the basis of the recorded positions, the positions of the spectrophotometer and the trigger sensor are aligned. Nevertheless, this requires a longer adjustment period and thus is not desirable.

SUMMARY OF THE INVENTION

An object of the present invention is to achieve a reading apparatus, a reading control method, and a reading control program capable of properly reading a region of a colorimetric patch without enlarging the colorimetric patch when the plurality of colorimetric patches is formed on a paper sheet.

That is, the present invention for solving the above problems is as follows.

(1) To achieve the abovementioned object, according to an aspect, a reading apparatus configured to read a plurality of colorimetric patches in different colors formed on a paper sheet and trigger patches formed so as to correspond to the colorimetric patches, reflecting one aspect of the present invention comprises: a colorimeter configured to read the colorimetric patches formed on the paper sheet; a trigger sensor configured to read the trigger patches formed on the paper sheet; and a controller configured to control a reading region at which the colorimeter reads the colorimetric patch on the basis of the trigger patches read by the trigger sensor, wherein the controller has a colorimetry region determination mode in which the reading region at which the colorimeter reads the colorimetric patch is determined on the basis of reading results for the trigger patches and a colorimetry adjustment mode in which the reading region determined in the colorimetry region determination mode is controlled so as to be read by the colorimeter, and in the colorimetry region determination mode, after the reading regions for the colorimetric patches are set to states where the reading regions for the colorimetric patches are gradually shifted in a reading direction with respect to the respective reading results for the trigger patches, the reading results for the colorimetric patches by the colorimeter are collected and thereafter, a region for which a state consistent with a characteristic of the colorimetric patch has been obtained as the reading result is determined as the reading region.

(2) According to Item. 1, the controller preferably distinguishes a mixed region where two different colorimetric patches have been read and an individual region where one colorimetric patch has been read from each other as the reading result for the respective colorimetric patches and then determines the individual region as the reading region.

(3) According to Item. 2, the controller preferably gradually shifts the reading regions for the colorimetric patches in the reading direction with respect to the respective reading results for the trigger patches such that the reading regions for the colorimetric patches are put in the order of the mixed region, the individual region, and the mixed region as the reading results for the respective colorimetric patches and then determines the reading region at a state where the reading result is obtained as the individual region.

(4) According to Item. 2, the controller preferably sets the reading regions for the colorimetric patches to states where the reading regions for the colorimetric patches are gradually shifted in the reading direction with respect to the respective reading results for the trigger patches such that the plurality of individual regions is successively generated as the reading results for the respective colorimetric patches and then determines the reading region from among the plurality of successive individual regions.

(5) According to Items. 2 to 4, the controller preferably determines, as a center of the reading region, a center of a range where the individual regions are obtained as the reading results for the respective colorimetric patches.

(6) According to Items. 1 to 5, as an approach for setting the reading regions for the colorimetric patches to states where the reading regions for the colorimetric patches are gradually shifted in the reading direction with respect to the respective reading results for the trigger patches in the colorimetry region determination mode, when the plurality of colorimetric patches in different colors and the trigger patches formed so as to be synchronized with the colorimetric patches are formed on the paper sheet, the controller preferably sets reading timings for the colorimetric patches by giving delay intervals different from one another to the respective reading results for the trigger patches.

(7) According to items. 1 to 5, as an approach for setting the reading regions for the colorimetric patches to states where the reading regions for the colorimetric patches are gradually shifted in the reading direction with respect to the respective reading results for the trigger patches in the colorimetry region determination mode, when the plurality of colorimetric patches in different colors and the trigger patches formed such that phases thereof are gradually displaced with respect to the corresponding colorimetric patches are formed on the paper sheet, the controller preferably sets reading timings for the colorimetric patches at a certain timing relative to the respective reading results for the trigger patches.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is an explanatory diagram illustrating how colorimetric patches are read in the embodiments of the invention;

FIG. 6 is an explanatory diagram illustrating how the colorimetric patches are read in the embodiments of the invention;

FIG. 7 is an explanatory diagram illustrating how the colorimetric patches are read in the embodiments of the invention;

FIG. 8 is a flowchart illustrating an action in the embodiments of the invention;

FIGS. 9A to 9E are explanatory diagrams illustrating how the colorimetric patches are read in the embodiments of the invention;

FIG. 16 is an explanatory diagram illustrating how the colorimetric patches are read in the embodiments of the invention;

FIGS. 17A to 17D are explanatory diagrams illustrating how the colorimetric patches are read in the embodiments of the invention;

FIG. 18 is an explanatory diagram illustrating how the colorimetric patches are read in the embodiments of the invention;

DESCRIPTION OF THE PREFERRED EMBODIMENTS

Hereinafter, embodiments for properly reading a colorimetric patch in a reading apparatus, a reading control method, and a reading control program of the present invention will be described in detail with reference to the drawings. However, the scope of the invention is not limited to the illustrated examples.

[Configuration of Reading Apparatus]

Figure 1:
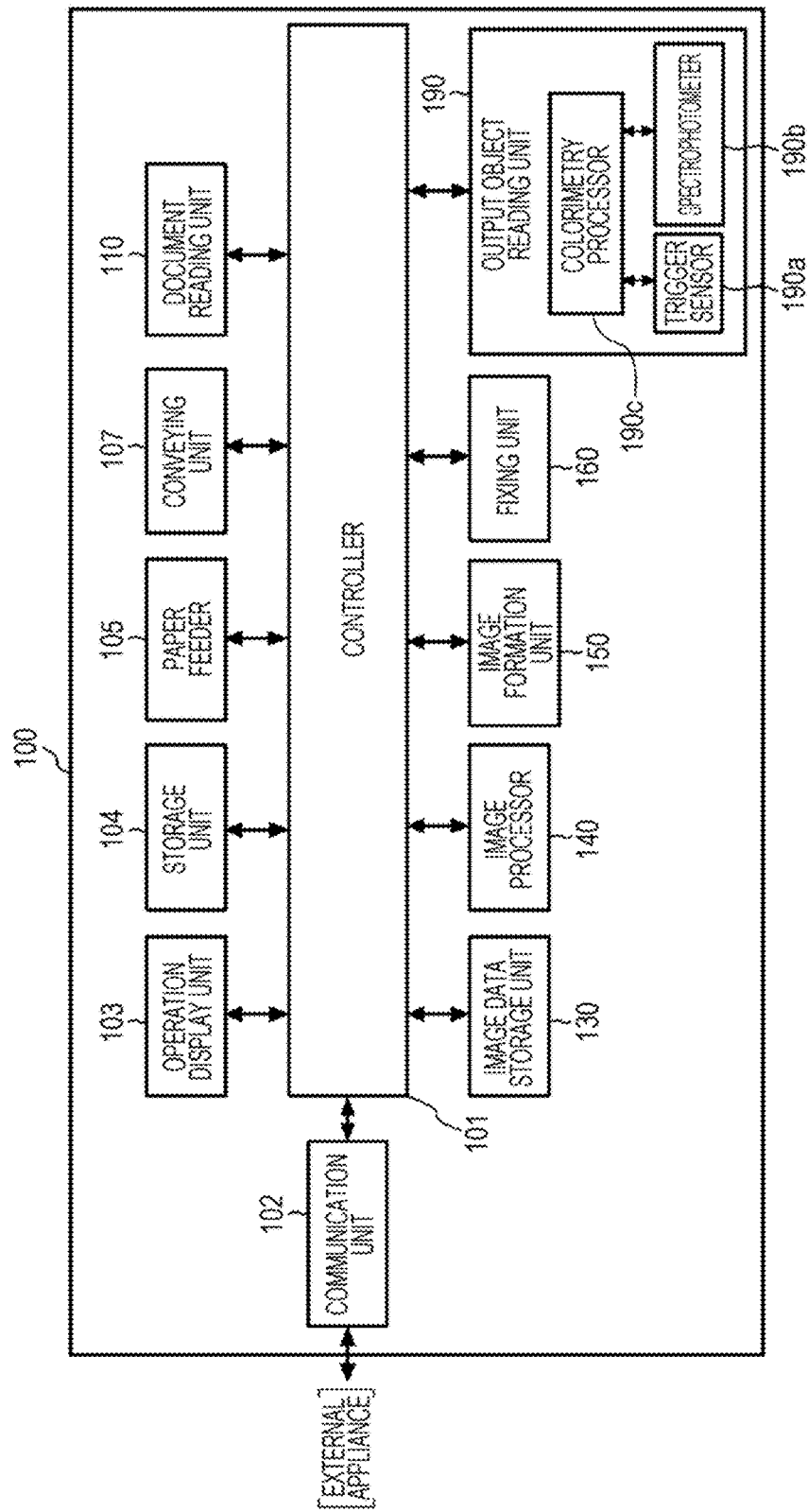
FIG. 1 is a configuration diagram illustrating a configuration of embodiments of the invention.
Figure 2:
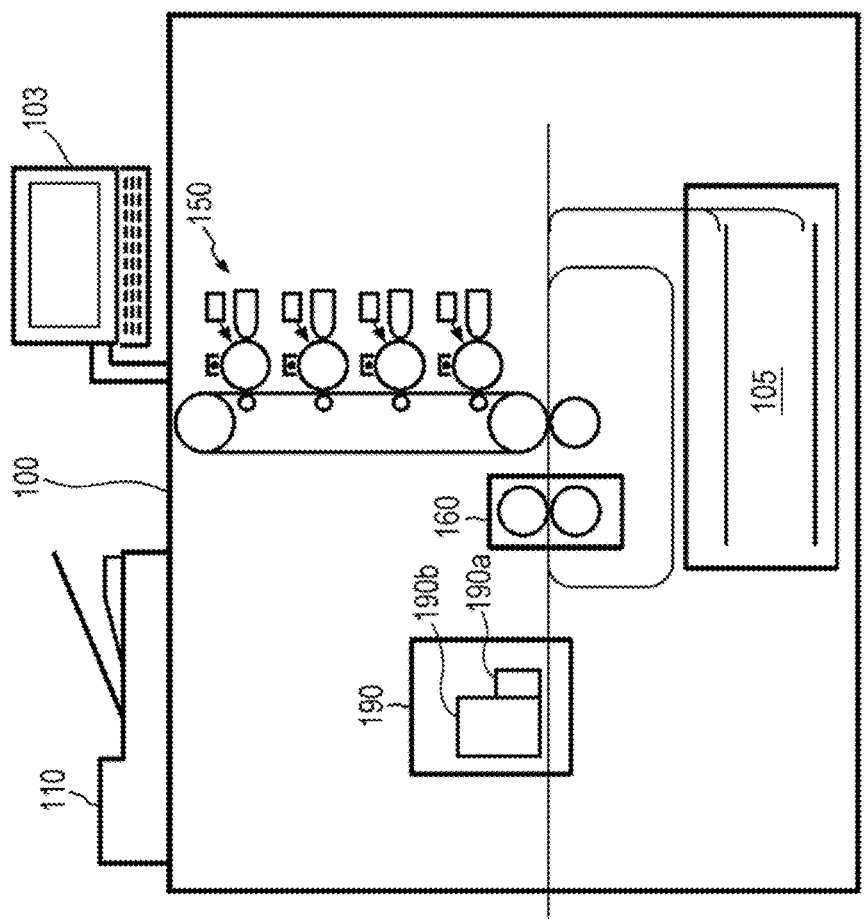
FIG. 2 is a configuration diagram illustrating a configuration of the embodiments of the invention.

Here, as an exemplary configuration of an image formation apparatus including a reading apparatus, detailed description will be given on the basis of FIG. 1 and FIG. 2. FIGS. 1 and 2 will describe an image formation apparatus 100 having therein an output object reading unit 190 serving as the reading apparatus.

The image formation apparatus 100 is configured by including a controller 101 that controls respective members within the image formation apparatus 100, a communication unit 102 that communicates with another apparatus connected thereto, an operation display unit 103 that receives input of operation by a user and displays a state of the image formation apparatus 100, a storage unit 104 that stores various settings, a paper feeder 105 capable of feeding a paper sheet held in a paper feed tray, a conveying unit 107 that conveys the paper sheet within the apparatus, a document reading unit 110 that reads an image on a document with an image pickup element, a read signal processor 120 that processes a read signal obtained at the image pickup element, an image data storage unit 130 that stores image data when an image is formed and various types of data, an image processor 140 that carries out various types of image processing required to form an image, an image formation unit 150 that forms an image on the paper sheet on the basis of an image formation instruction and the image data, a fixing unit 160 that stabilize the image formed with toner on the paper sheet by using heat and pressure, and the output object reading unit 190 that reads an image (output object) on the paper sheet obtained as a result of the image formation by using an image pickup element.

The document reading unit 110 employs a line sensor as the image pickup element, which is provided with a function for reading a document placed on a platen glass as well as a function for reading a document while being conveyed and configured to read images on both surfaces of a document by using either of the functions.

In addition, the read signal processor 120 is included in the controller 101 and carries out various types of read signal processing on the read signal obtained at the document reading unit 110 and the read signal obtained at the output object reading unit 190, such as shading correction, chromatic aberration correction, color correction, resolution conversion, and rotation processing. The read signal processor 120 may be provided at the outside of the controller 101.

Meanwhile, as illustrated in FIG. 2, the image formation unit 150 is configured by including an image carrier on which a toner image is formed, an electricity charging unit that charges the image carrier with electricity at a predetermined electric potential, an exposure unit that causes the charged image carrier to be exposed in accordance with the image data and forms an electrostatic latent image, a developing unit that develops the electrostatic latent image to a toner image, an intermediate transfer body on which the toner images on the image carriers of respective colors are combined, a transfer unit that transfers the toner image on the intermediate transfer body to the paper sheet. Although the image formation unit 150 for forming a color image has been indicated here, an image formation unit for one color may be employed.

Figure 21:
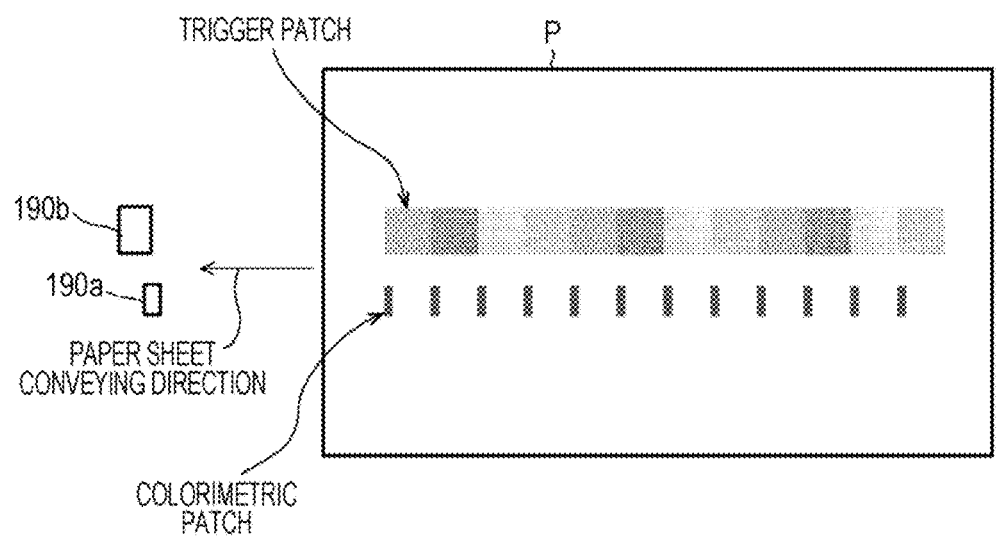
FIG. 21 is an explanatory diagram for explaining how the colorimetric patches are read.
Figure 22:
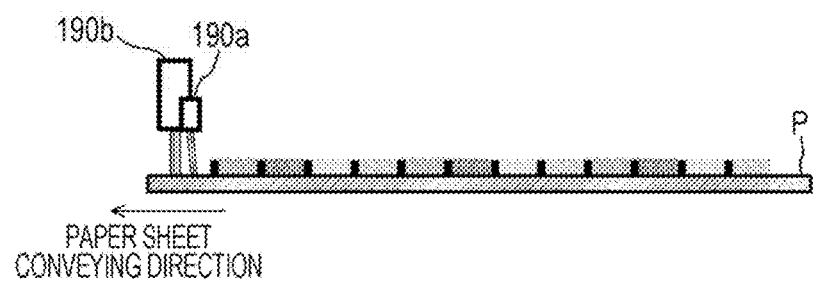
FIG. 22 is an explanatory diagram for explaining how the colorimetric patches are read.

In addition, the output object reading unit 190 may have a line sensor configured to read an entire surface of an output object. In particular, however, the output object reading unit 190 is configured by including a trigger sensor 190a, a spectrophotometer 190b, and a colorimetry processor 190c and provided with a function for reading the paper sheet on which an image is formed while being conveyed, with which an image on the paper sheet or the patch is read (refer to FIG. 21 and FIG. 22). The output object reading unit 190 is arranged on a downstream side of the fixing unit 160 in a paper sheet conveying direction and configured to read an image on the paper sheet to be output while being conveyed.

In the above-described configuration in FIG. 1 and FIG. 2, a reading timing at the spectrophotometer 190b is controlled by the colorimetry processor 190c and the controller 101 on the basis of a detection result by the trigger sensor 190a, whereby the colorimetric patch is read in an appropriate state. Data of the colorimetric patch read at the spectrophotometer 190b is transmitted to the image processor 140 from the colorimetry processor 190c and then compared with original print data at the image processor 140. Subsequently, a color to be found out from a color obtained by reading the colorimetric patch is calculated and print data is optimized at the image processor 140 such that a desired color can be output from the image formation unit 150. Examples of the image optimization include density adjustment and color tone adjustment. Additionally, at the image processor 140, the data of the colorimetric patch read at the spectrophotometer 190b is arithmetically calculated into L*a*b* color space data or XYZ color space data from reflected light of respective components of separated light, whereby a color tone is deduced.

An analog output type reflective photosensor formed by an LED light source and a photo transistor is suitable as the trigger sensor 190a. The amount of reflection is increased on a white background on the paper sheet and the reflection is weakened at a section of a trigger patch formed in black, where an output electric current flows in accordance therewith. By converting this output electric current into a voltage, black and white can be distinguished from each other in an analog manner. A trigger sensor signal that has been output from the trigger sensor 190a and digitally converted is input to a trigger controller 190c equipped in a control device such as a microcontroller or an FPGA. The colorimetry processor 190c forms a predetermined delay interval to generate a trigger control signal and, on the basis of this trigger control signal, controls a colorimetry start and a colorimetry end for the spectrophotometer 190b.

Figure 3:
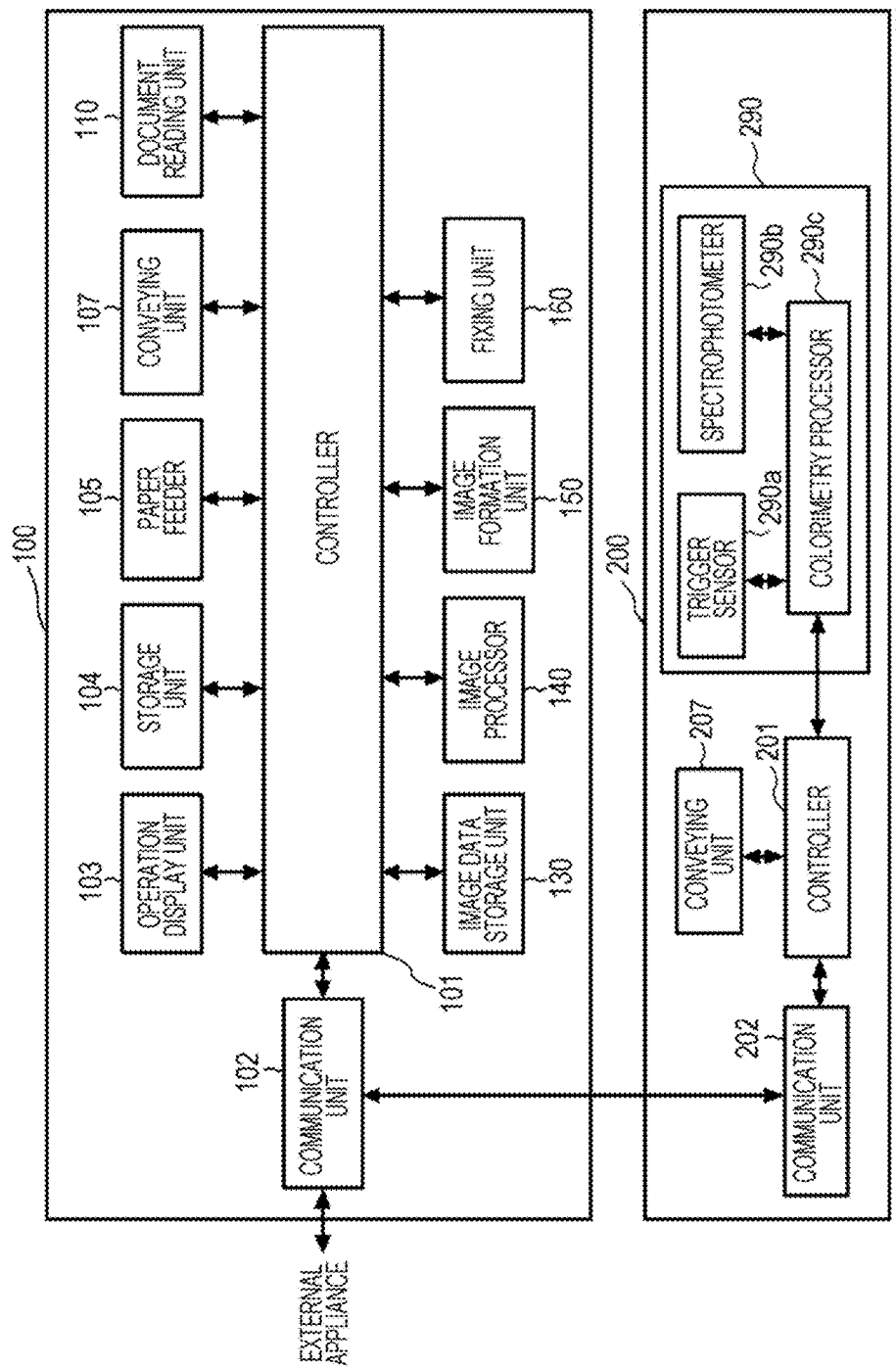
FIG. 3 is a configuration diagram illustrating a configuration of the embodiments of the invention.
Figure 4:
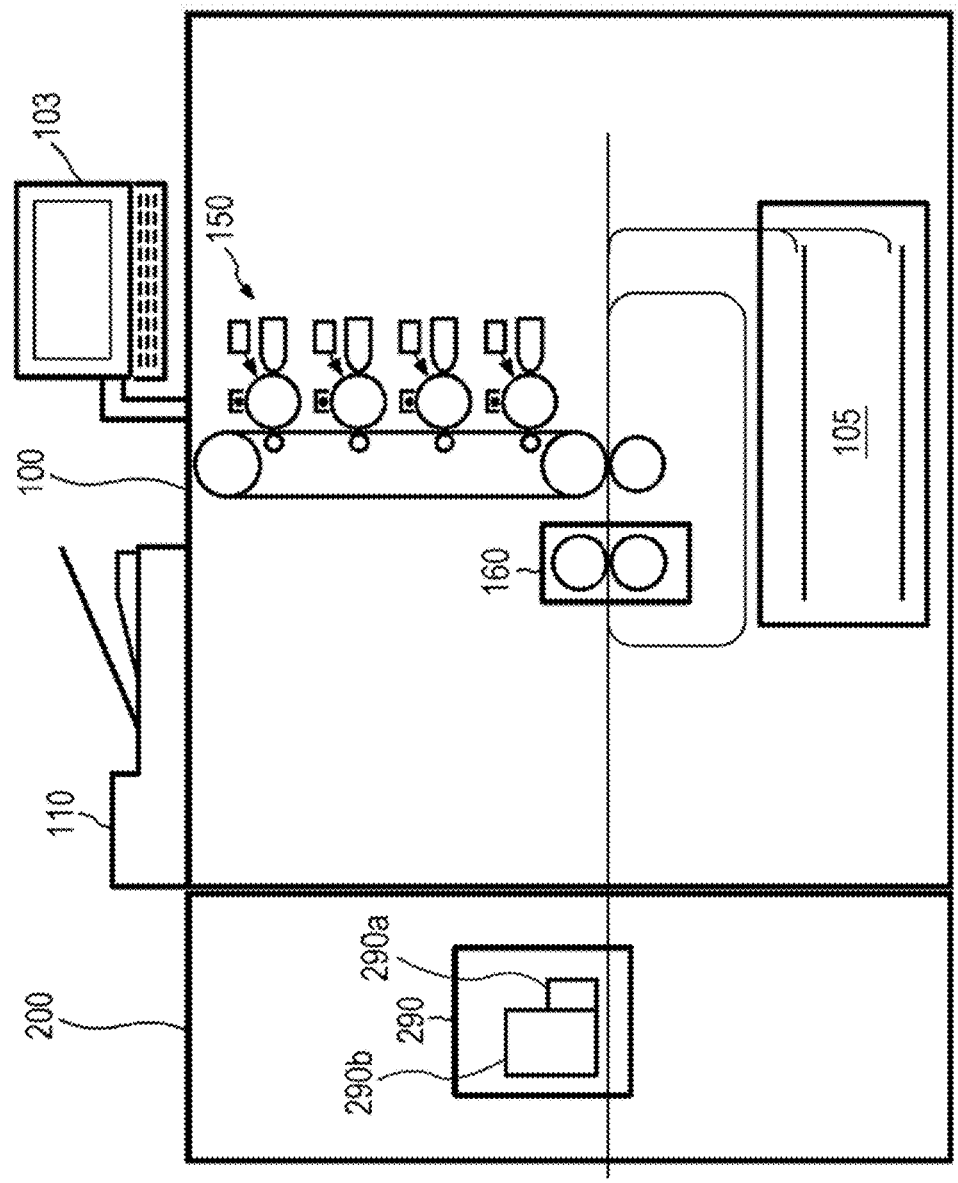
FIG. 4 is a configuration diagram illustrating a configuration of the embodiments of the invention.

Here, as another exemplary configuration of an image formation system, detailed description will be given on the basis of FIG. 3 and FIG. 4. FIGS. 3 and 4 will describe an image formation system having an image formation apparatus 100 and a reading apparatus 200. Here, the image formation apparatus 100 is similar to that indicated in FIG. 1 and FIG. 2, where the output object reading unit 190 (refer to FIG. 1 and FIG. 2) is not provided therein. The same members between FIGS. 1 and 2 and FIGS. 3 and 4 are denoted by the same reference numerals and duplicated description will be omitted. In addition, the reading apparatus 200 is arranged on a downstream side of the image formation apparatus 100 in the paper sheet conveying direction. The reading apparatus 200 is configured by including a controller 201, a communication unit 202, a conveying unit 207 that conveys the paper sheet, and an output object reading unit 290 that reads an image on the paper sheet obtained as a result of the image formation and also configured to read an image on the paper sheet to be output while being conveyed. This reading apparatus 200 can be also built in an intermediate apparatus that carries out paper sheet inversion or a post-processing apparatus that carries out various types of post-processing such as brochure creation. Meanwhile, the output object reading unit 290 has a similar configuration as that of the output object reading unit 190 (FIG. 1) and configured by including a trigger sensor 290a, a spectrophotometer 290b, and a colorimetry processor 290c.

[Description of Patch (1)]

The reading apparatus according to this embodiment has a colorimetry region determination mode for determining a reading region at which the colorimetric patch is read by the spectrophotometer on the basis of reading results for the trigger patches and a colorimetry adjustment mode for controlling the reading region determined in the colorimetry region determination mode such that the reading region is read by the spectrophotometer. Details of the actions of the respective modes will be described later.

Hereinafter, the trigger patch and the colorimetric patch in a chart (colorimetry region determination chart) used in the colorimetry region determination mode according to the embodiment will be described with reference to FIG. 5 and following.

In the colorimetry region determination mode, in order to adjust a region at which the colorimetric patch is actually read in the colorimetry adjustment mode, it is desirable to use the colorimetric patches in two colors having a large difference in color or density in such a manner as to be arranged in the order of black, white, black, white, and so forth. In FIG. 5 and following, sections in white are expressed by dashed lines.

In the specific example illustrated in FIG. 5, the trigger sensor 190a and the spectrophotometer 190b have a phase in which the trigger sensor 190a is arranged on a further upstream side in the paper sheet conveying direction than the spectrophotometer 190b. Accordingly, the trigger patches corresponding to the colorimetric patches illustrated in FIG. 5 are arranged at the same phase therewith in the paper sheet conveying direction. In particular, here, the trigger patches are arranged at the same phase with the black colorimetric patches. With this, the colorimetry can be started from a position closer to a leading edge side of the paper sheet than the black colorimetric patch at the same phase with the trigger patch.

As for the trigger sensor 190a and the spectrophotometer 190b in the specific example illustrated in FIG. 6, the trigger sensor 190a and the spectrophotometer 190b have the same phase with each other in the paper sheet conveying direction. Accordingly, the trigger patches corresponding to the colorimetric patches illustrated in FIG. 6 are arranged on the leading edge side of the paper sheet in the paper sheet conveying direction. In particular, here, the trigger patches are arranged on the leading edge side of the paper sheet while corresponding to the black colorimetric patches. With this, the colorimetry can be started from a position closer to the leading edge side of the paper sheet than the black colorimetric patch corresponding to the trigger patch.

In the specific example illustrated in FIG. 7, the trigger sensor 190a and the spectrophotometer 190b have a phase in which the trigger sensor 190a is arranged on a further upstream side in the paper sheet conveying direction than the spectrophotometer 190b. Accordingly, the trigger patches corresponding to the colorimetric patches illustrated in FIG. 7 are arranged at the same phase therewith in the paper sheet conveying direction. In particular, here, the trigger patches are arranged at the same phase with the black colorimetric patches and the white colorimetric patches. With this, the colorimetry can be started from a position closer to the leading edge side of the paper sheet than the black colorimetric patch or the white colorimetric patch at the same phase with the trigger patch. The trigger patches can be also disposed so as to correspond to the white colorimetric patches in the specific example illustrated in FIG. 6 as well.

FIGS. 5 to 7 have illustrated a state where the plurality of black colorimetric patches and white colorimetric patches is alternately placed in order in the paper sheet conveying direction. However, the colorimetric patches are not limited to this. For example, a combination of the colorimetric patches having different hues or brightness from each other also can be employed such as yellow and cyan or blue and red.

[Description of Action (1)]

Hereinafter, embodiments of the reading apparatus, the reading control method, and the reading control program according to the embodiment will be described with reference to a flowchart in FIG. 8. Here, the description will be given on the assumption of that the reading apparatus is included in the image formation apparatus 100, or alternatively, the image formation apparatus 100 and the reading apparatus work in coordination with each other. This description of the action also serves as a processing procedure of the reading control method. In addition, this description of the action also serves as processing steps of the reading control program.

By referring to an action state of the image formation apparatus 100 or a past action history thereof, the controller 101 determines whether the adjustment is required at the current time point (step S101 in FIG. 8).

When a timing for carrying out the adjustment is not reached (NO at step S101 in FIG. 8), the controller 101 controls respective members such that the image formation unit 150 carries out printing in response to an order from the operation display unit 103 or an external appliance (step S118 to S120 in FIG. 8).

When the timing for carrying out the adjustment as the colorimetry region determination mode is reached such as a case where the output object reading unit 190 is replaced as a unit or a case where there is a possibility of a shock being added to the image formation apparatus 100 while being moved (YES at step S101 and YES at S102 in FIG. 8), the controller 101 causes the image formation unit 150 to print the colorimetry region determination chart (refer to FIGS. 5 to 7) and conveys the colorimetry region determination chart to the output object reading unit 190 (step S103 in FIG. 8).

Hereinafter, the description of the action will be continued also with reference to time charts in FIGS. 9A to 9E. Note that, in FIGS. 9A to 9E, a low level is assumed to represent an active state.

When the colorimetry region determination chart is conveyed to the output object reading unit 190, the trigger patch is read by the trigger sensor 190a and the trigger sensor signal (FIG. 9A) is output.

In response to the trigger sensor signal from the trigger sensor 190a, the colorimetry processor 190c generates the trigger control signal (FIG. 9B) corresponding to the trigger sensor signal. This trigger control signal is a digital signal generated from falling (or rising) of the trigger sensor signal serving as an analog signal obtained by shaping a waveform.

At this time, with respect to the respective trigger control signals, the colorimetry processor 190c generates variable delay trigger control signals (FIG. 9C) having delay intervals different from one another.

In this case, the variable delay trigger control signal having a delay interval d0 (delay=0) is generated with respect to a first pulse of the trigger control signal. Likewise, the variable delay trigger control signal having a delay interval d1 (delay>0) is generated with respect to a second pulse of the trigger control signal. In addition, the variable delay trigger control signal having a delay interval d2 (d2>d1) is generated with respect to a third pulse of the trigger control signal. In this manner, the colorimetry processor 190c generates the variable delay trigger control signals (FIG. 9C) from the respective trigger control signals (FIG. 9B) such that the delay intervals are made larger gradually. Subsequently, the colorimetry processor 190c causes the spectrophotometer 190b to carry out the colorimetry on the basis of the above-described variable delay trigger control signals (FIG. 9D).

In the colorimetry by the spectrophotometer 190b based on the variable delay trigger control signals generated by giving variable delay intervals to the detection results for the trigger patches in such a manner as described above, a relationship between the positions of the colorimetric patches and regions at which the colorimetry is to be carried out (reading regions) is as indicated in FIG. 9E.

In FIG. 9E, solid black rectangles represent the arrangement of the colorimetric patches, whereas arrows in gray represent the regions at which the colorimetry is to be carried out by the spectrophotometer 190b (reading regions).

Specifically, in this colorimetry region determination mode, the reading regions for the colorimetric patches are set to states where the reading regions for the colorimetric patches are gradually shifted in a reading direction (paper sheet conveying direction) with respect to the respective reading results for the trigger patches (step S104 in FIG. 8).

The colorimetry processor 190c collects colorimetry results for the respective colorimetric patches obtained at the spectrophotometer 190b as described above (colorimetry region determination data) (step S105 in FIG. 8) and analyzes the collected colorimetry region determination data (step S106 in FIG. 8).

Figure 10:
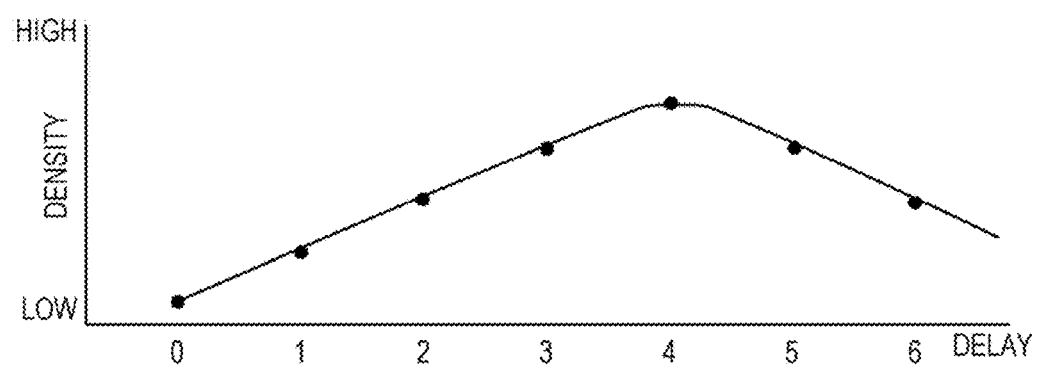
FIG. 10 is an explanatory diagram illustrating how the colorimetric patches are read in the embodiments of the invention.

In FIG. 10, density values for the colorimetry region determination data obtained through the colorimetry carried out by the spectrophotometer 190b on the basis of the variable delay trigger control signals with delays d0 to d6 as described above are expressed as a graph.

As it is clear from FIG. 9E, with delay d0, both of a white region on a blank space and the black colorimetric patch are read (mixed region). Subsequently, while proceeding to delay d1, delay d2, and so forth, although the mixed regions constituted by the white colorimetric patches and the black colorimetric patches are still obtained, a ratio of the black colorimetric patch is increased and the density value in FIG. 10 is accordingly raised. When reaching delay d4, an individual region constituted by the black colorimetric patch alone is obtained and the density value in FIG. 10 marks the maximum value. Thereafter, while proceeding to delay d5, delay d6, and so forth, the mixed regions constituted by the white colorimetric patches and the black colorimetric patches are obtained again, where a ratio of the white colorimetric patch is increased and the density value in FIG. 10 is lowered.

Accordingly, the colorimetry processor 190c determines, as an optimum reading region, a region for which a state most consistent with the characteristic of the colorimetric patch has been obtained, namely, colorimetry with delay d4 having the highest density value in the detection result as the characteristic of the black colorimetric patch (step S107 in FIG. 8). Here, the colorimetry processor 190c stores delay d4 for generating the variable delay trigger control signals to the storage unit 104 or the like through the controller 101 (step S108 in FIG. 8).

With such a configuration, it is made possible to properly read the reading regions for the colorimetric patches without enlarging the size of the colorimetric patches when the plurality of colorimetric patches is formed on the paper sheet.

Additionally, in the above-described colorimetry by the spectrophotometer 190b based on the variable delay trigger control signals, it is desirable that the reading regions for the colorimetric patches be gradually shifted in the reading direction with respect to the respective reading results for the trigger patches so as to be put in the order of the mixed region, the individual region, and the mixed region as the reading results for the respective colorimetric patches and then, the reading region be determined at a state where the reading result is obtained as the individual region. As a result of this, it is made possible to properly read the reading regions for the colorimetric patches as the individual regions instead of the mixed regions without enlarging the size of the colorimetric patches when the plurality of colorimetric patches is formed on the paper sheet.

Meanwhile, even in a case where there are problems caused during manufacturing such as a positional difference in the paper sheet conveying direction between the trigger sensor 190a and the spectrophotometer 190b (refer to FIG. 21) and a difference in detection directivity in the paper sheet conveying direction between the trigger sensor 190a and the spectrophotometer 190b (refer to FIG. 22), proper reading of the colorimetric patches can be achieved in the above-described configuration and consequently, the calibration or the like for the spectrophotometer 190b and the trigger sensor 190a is no longer required.

A specific example has been described thus fur for a case where the trigger patches are arranged so as to correspond to the black colorimetric patches (FIG. 5 and FIG. 6). In contrast to this, a case where the trigger patches are arranged so as to correspond to both of the black colorimetric patches and the white colorimetric patches as in FIG. 7 will be described hereinafter.

Figure 11:
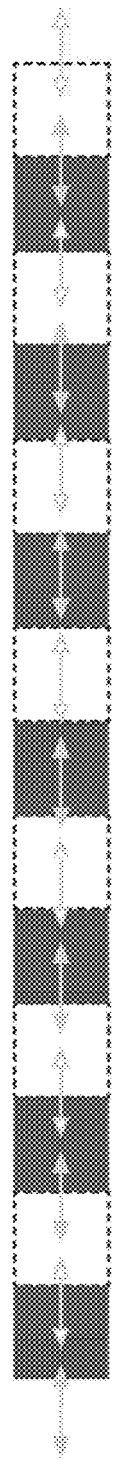
FIG. 11 is an explanatory diagram illustrating how the colorimetric patches are read in the embodiments of the invention.

In this case, the reading regions for the black colorimetric patches and the white colorimetric patches, which correspond to the aforementioned relationship between the patches and the reading regions (refer to FIG. 9E), are as indicated in FIG. 11.

Figure 12:
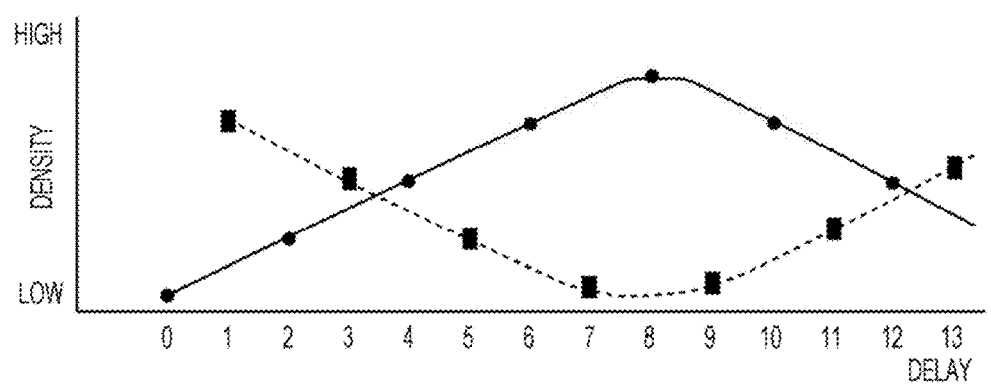
FIG. 12 is an explanatory diagram illustrating how the colorimetric patches are read in the embodiments of the invention.

In addition, a graph expressing the density values for the colorimetry region determination data obtained through the colorimetry on the black colorimetric patches carried out by the spectrophotometer 190b on the basis of the variable delay trigger control signals with delays d0, d2, d4, d6, d8, d10, d12, and so forth is obtained as indicated by a solid line in FIG. 12. Likewise, a graph expressing the density values for the colorimetry region determination data obtained through the colorimetry on the white colorimetric patches carried out by the spectrophotometer 190b on the basis of the variable delay trigger control signals with delays d1, d3, d5, d7, d9, d11, d13, and so forth is obtained as indicated by a dashed line in FIG. 12.

Accordingly, the colorimetry processor 190c determines delay d8 as an optimum reading region on the basis of a region for which a state most consistent with the characteristics of the colorimetric patches has been obtained, namely, a colorimetry result with delay d8 having the highest density value in the detection result as the characteristic of the black colorimetric patch as well as colorimetry results with delays d7 to d9 having the lowest density values in the detection results as the characteristic of the white colorimetric patch (step S107 in FIG. 8). Here, the colorimetry processor 190c stores delay d8 for generating the variable delay trigger control signals to the storage unit 104 or the like through the controller 101 (step S108 in FIG. 8).

Similarly, in a case where cyan colorimetric patches and yellow colorimetric patches are alternately arranged instead of the black colorimetric patches and the white colorimetric patches, the colorimetry processor 190c determines delay d8 as an optimum reading region on the basis of a region for which a state most consistent with the characteristics of the colorimetric patches has been obtained, namely, a colorimetry result with delay d8 having the most cyan components in the detection result as the characteristic of the cyan colorimetric patch as well as colorimetry results with delays d7 to d9 having the lowest cyan values (where values for yellow are emphasized) in the detection results as the characteristic of the yellow colorimetric patch.

Figure 13:
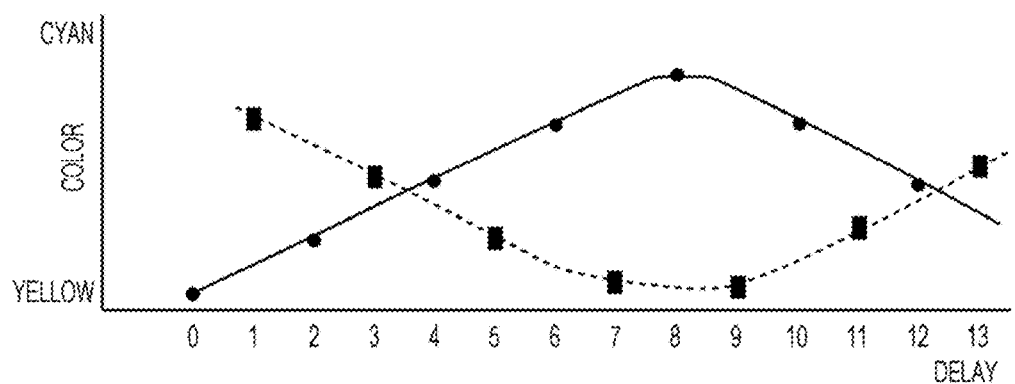
FIG. 13 is an explanatory diagram illustrating how the colorimetric patches are read in the embodiments of the invention.

Meanwhile, how to handle a case where clear peaks and troughs as in FIG. 10, FIG. 12, and FIG. 13 do not appear in the colorimetry region determination data will be described hereinafter.

Figure 14:
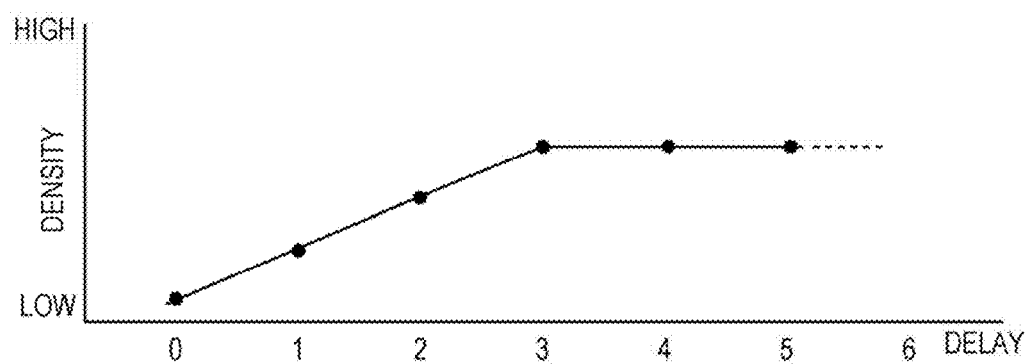
FIG. 14 is an explanatory diagram illustrating how the colorimetric patches are read in the embodiments of the invention.

As in FIG. 14, while proceeding to delay d0, delay d1, delay d2, and so forth, although the mixed regions constituted by the white colorimetric patches and the black colorimetric patches are obtained, a ratio of the black colorimetric patch is increased and the density value is accordingly raised. Thereafter, while proceeding to delay d4, delay d5, delay d6, and so forth, the constant density values are obtained. In this case, the colorimetry processor 190c assumes that a stable region for the black colorimetric patch is started at this delay d5. Accordingly, the subsequent actions from this time point can be omitted in the colorimetry region determination mode. Therefore, the action in the colorimetry region determination mode and the output of the colorimetry region determination chart are terminated, whereby the adjustment period and the paper sheets for the adjustment can be reduced.

Figure 15:
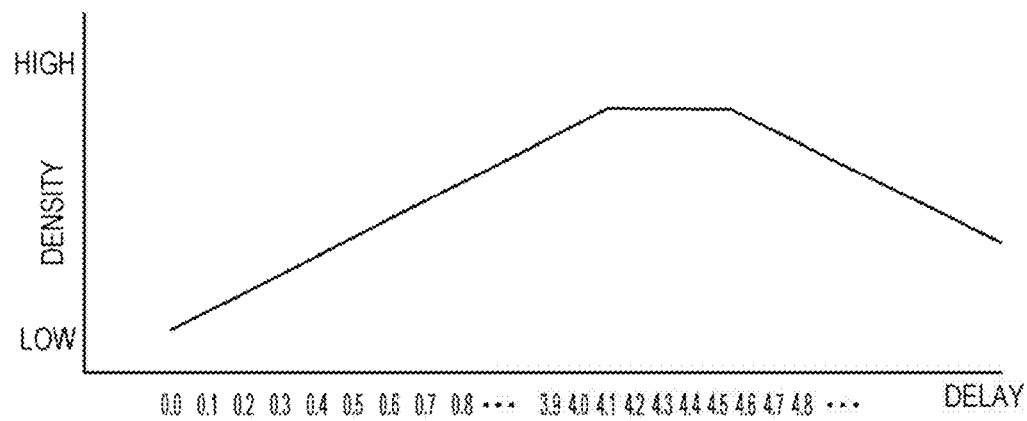
FIG. 15 is an explanatory diagram illustrating how the colorimetric patches are read in the embodiments of the invention.
Figure 19:
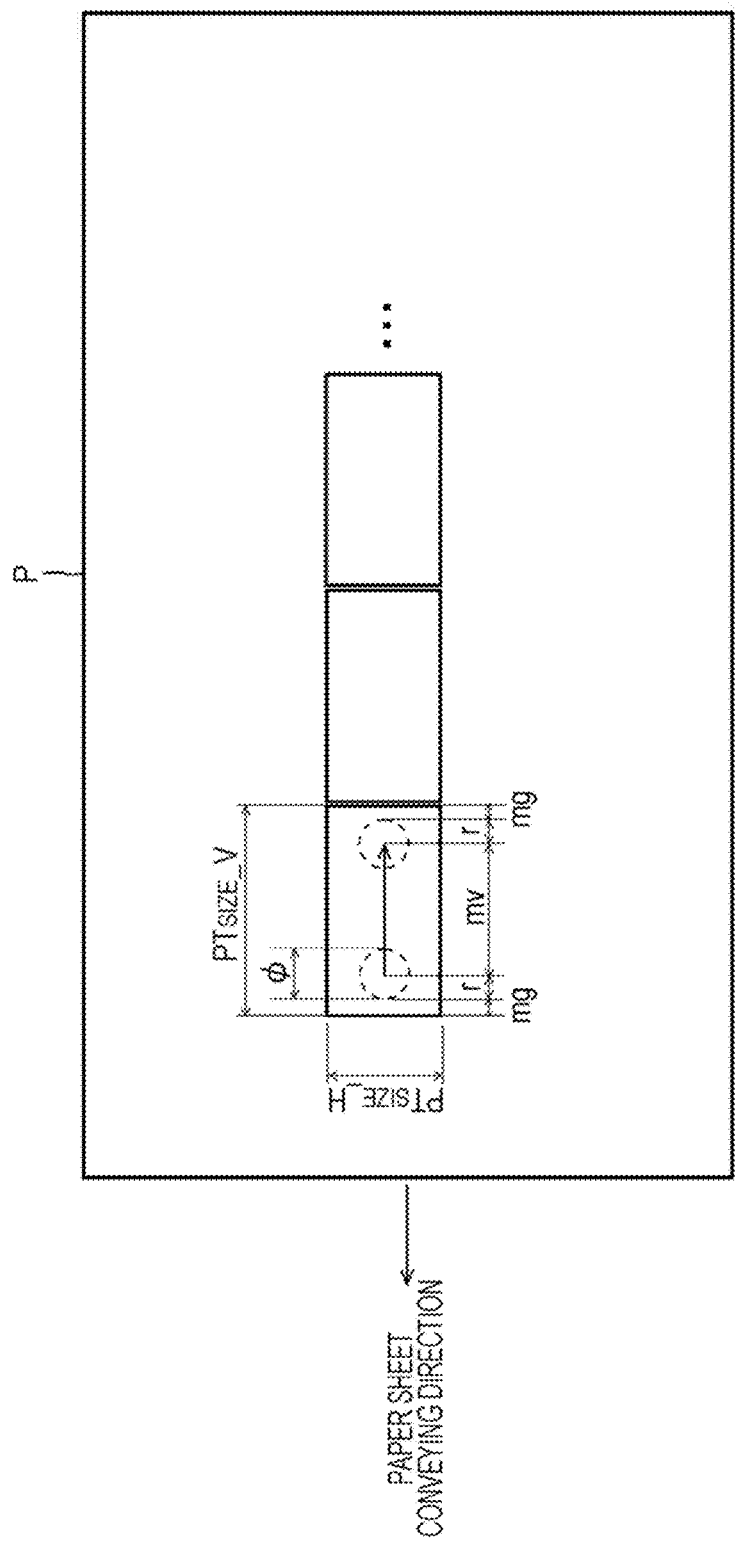
FIG. 19 is an explanatory diagram for explaining how the colorimetric patches are read.
Figure 20:
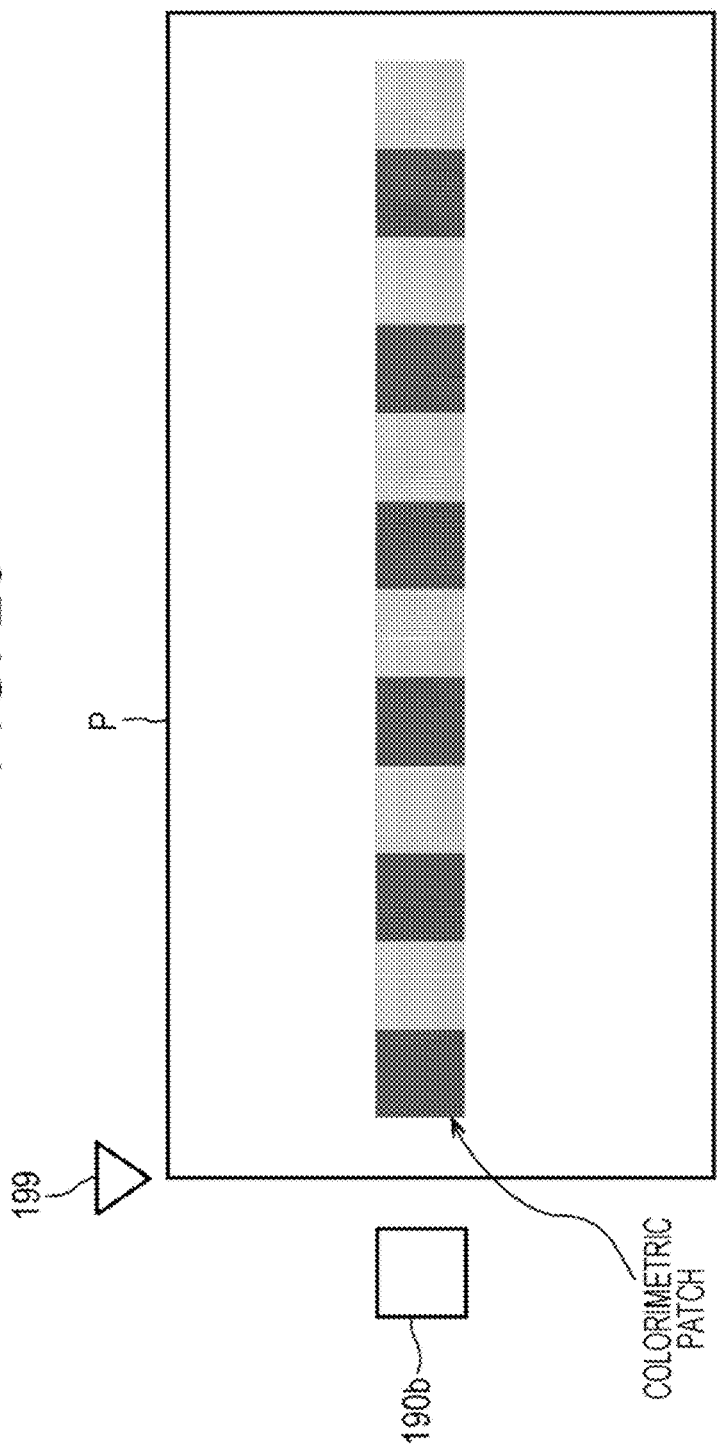
FIG. 20 is an explanatory diagram for explaining how the colorimetric patches are read.

In addition, FIG. 15 illustrates how the colorimetry region determination mode works when the resolution for delays of the variable delay trigger control signals is raised. In this case, the individual regions constituted by the black colorimetric patch alone are obtained in a range from delay d42 to delay d46 and the density value marks the maximum value therein. Accordingly, for this case, the colorimetry processor 190c determines, as an optimum reading region, delay d44 serving as a median in the range from delay d42 to delay d46.

Meanwhile, the colorimetry processor 190c may be configured to determine the optimum reading region on the basis of a median or a center of gravity of the entire peak or trapezoidal shape in a case where the peak or the trapezoidal shape as described above appears with a shape formed equally on both sides.

Subsequently, when the image formation apparatus 100 has already formed a certain number of images, the controller 101 determines that the colorimetry adjustment is required (YES at step S109 in FIG. 8) and then carries out the colorimetry adjustment. In this case, various types of colorimetry setting values are read from the storage unit 104 (step S112 in FIG. 8) and a colorimetric chart for the colorimetry adjustment mode is printed at the image formation unit 150 so as to be conveyed to the output object reading unit 190 (step S113 in FIG. 8).

Thereafter, in order to obtain the optimum reading region determined as described above, the spectrophotometer 190b reads the colorimetric patch with a predetermined delay interval from the trigger control signal under the control of the colorimetry processor 190c, whereby the colorimetry is controlled such that the individual region is used for each of the colorimetric patches in the colorimetric chart (step S114 in FIG. 8).

Data of the colorimetric patch read at the spectrophotometer 190b is transmitted to the image processor 140 from the colorimetry processor 190c and then compared with the original print data at the image processor 140. Subsequently, a color to be found out from a color obtained by reading the colorimetric patch is calculated and print data is optimized at the image processor 140 such that a desired color can be output from the image formation unit 150 (steps S115, S116, and S117 in FIG. 8).

Meanwhile, when it is determined that other adjustment is required to be carried out in the image formation apparatus (YES at step S110 in FIG. 8), the controller 101 carries out other adjustment (step S111 in FIG. 8).

In addition, when a print order is generated from the operation display unit 103 or an external appliance after the adjustment described above has been carried out, the controller 101 controls respective members such that the image formation unit 150 carries out printing (step S118 to S120 in FIG. 8).

[Description of Patch and Description of Action (2)]

In the description above, the trigger patches and the colorimetric patches in the colorimetry region determination chart have been placed in order so as to be synchronized with each other as in FIGS. 5 to 7. Additionally, the variable delay trigger control signal for the variable delay interval has been generated with respect to the trigger control signal obtained from the trigger patch.

In contrast to this, as in FIG. 16, it is possible to reflect components of the variable delay intervals contained in the variable delay trigger control signals to the positions of the trigger patches.

In this case in FIG. 16, the components of the variable delay intervals that should be contained in the variable delay trigger control signals, namely, shifts of the colorimetry regions are reflected to the positions of the trigger patches. Consequently, when the trigger control signals (FIG. 17B) are generated from the trigger sensor signals obtained from the trigger patches (FIG. 17A) and these trigger control signals are used to give an instruction on the colorimetry to the spectrophotometer 190b (FIG. 17C), the reading regions for the colorimetric patches are set to states where the reading regions for the colorimetric patches are gradually shifted in the reading direction (paper sheet conveying direction) (FIG. 17D). This case does not require the generation of delay signals d0, d1, and so forth for the variable delay intervals and thus has an advantage of having no need for disposing a precise delay circuit.

[Description of Patch and Description of Action (3)]

In a case where there is a request for reducing the image adjustment period, it is also possible to equip the plurality of spectrophotometers 190b. Here, FIG. 18 illustrates an example where two spectrophotometers 190b1 and 190b2 are equipped.

Here, the colorimetric patches are printed at positions in accordance with the two spectrophotometers 190b1 and 190b2 by the image formation unit 150.

Even a single set of the trigger patches and a single trigger sensor 190a function sufficiently since the variable delay trigger control signals adapted to the respective two spectrophotometers 190b1 and 190b2 are generated from one trigger control signal. Subsequently, proper delays are individually found out from the variable delay trigger control signals adapted to the two spectrophotometers 190b1 and 190b2, whereby the optimum reading regions can be determined. In the example in FIG. 18, it is observed that the sixth state from the left is the optimum reading region for the spectrophotometer 190b1 and the fifth state from the left is the optimum reading region for the spectrophotometer 190b2.

[Other Description]

The above description of the respective embodiments has indicated a specific example where the optimum reading region is found out in a range of the colorimetry region determination chart on the single paper sheet P. However, the embodiments are not limited thereto. For example, the optimum reading region may be found out in a range spanning the plurality of colorimetry region determination charts while the resolution is raised.

(1) According to an embodiment of the present invention, in a reading apparatus to which an aspect of embodiments of the present invention is reflected, in the colorimetry region determination mode, after the reading regions for the colorimetric patches are set to states where the reading regions for the colorimetric patches are gradually shifted in the reading direction with respect to the respective reading results for the trigger patches, the reading results for the colorimetric patches by the colorimeter are collected and thereafter, a region for which a state consistent with the characteristic of the colorimetric patch has been obtained as the reading result is determined as the reading region. Subsequently, in the colorimetry adjustment mode, the reading regions determined in the colorimetry region determination mode is controlled so as to be read by the colorimeter. As a result of this, it is made possible to properly read the reading regions for the colorimetric patches without enlarging the colorimetric patches when the plurality of colorimetric patches is formed on the paper sheet.

(2) In the above-described (1), preferably, the mixed region where two different colorimetric patches have been read and the individual region where one colorimetric patch has been read are distinguished from each other as the reading results for the respective colorimetric patches and then, the individual region is determined as the reading region. As a result of this, it is made possible to properly read the reading regions for the colorimetric patches as the individual regions without enlarging the colorimetric patches when the plurality of colorimetric patches is formed on the paper sheet.

(3) In the above-described (2), preferably, the reading regions for the colorimetric patches are gradually shifted in the reading direction with respect to the respective reading results for the trigger patches so as to be put in the order of the mixed region, the individual region, and the mixed region as the reading results for the respective colorimetric patches and then, the reading region is determined at a state where the reading result is obtained as the individual region. As a result of this, it is made possible to properly read the reading regions for the colorimetric patches as the individual regions instead of the mixed regions without enlarging the colorimetric patches when the plurality of colorimetric patches is formed on the paper sheet.

(4) In the above-described (2), preferably, the reading regions for the colorimetric patches are set to states where the reading regions for the colorimetric patches are gradually shifted in the reading direction with respect to the respective reading results for the trigger patches such that the plurality of individual regions is successively generated as the reading results for the respective colorimetric patches and then, the reading region is determined from among the plurality of successive individual regions. As a result of this, it is made possible to read optimum regions for the reading regions for the colorimetric patches as the individual regions without enlarging the colorimetric patches when the plurality of colorimetric patches is formed on the paper sheet.

(5) In the above-described (2) to (4), preferably, a center of a range where the individual regions are obtained as the reading results for the respective colorimetric patches is determined as a center of the reading region. As a result of this, it is made possible to read optimum regions for the reading regions for the colorimetric patches as the individual regions without enlarging the colorimetric patches when the plurality of colorimetric patches is formed on the paper sheet.

(6) In the above-described (1) to (5), preferably, as an approach for setting the reading regions for the colorimetric patches to states where the reading regions for the colorimetric patches are gradually shifted in the reading direction with respect to the respective reading results for the trigger patches in the colorimetry region determination mode, when the plurality of colorimetric patches in different colors and the trigger patches formed so as to be synchronized with the colorimetric patches are formed on the paper sheet, the reading timings for the colorimetric patches are set by giving delay intervals different from one another to the respective reading results for the trigger patches. As a result of this, it is made possible to properly read the reading regions for the colorimetric patches without enlarging the colorimetric patches when the plurality of colorimetric patches and the trigger patches is formed so as to be synchronized with each other on the paper sheet.

(7) In the above-described (1) to (5), preferably, as an approach for setting the reading regions for the colorimetric patches to states where the reading regions for the colorimetric patches are gradually shifted in the reading direction with respect to the respective reading results for the trigger patches in the colorimetry region determination mode, when the plurality of colorimetric patches in different colors and the trigger patches formed such that the phases thereof are gradually displaced with respect to the corresponding colorimetric patches are formed on the paper sheet, the reading timings for the colorimetric patches are set at a certain timing relative to the respective reading results for the trigger patches. As a result of this, it is made possible to properly read the reading regions for the colorimetric patches without enlarging the colorimetric patches while a sort of timing delay for setting the reading regions is not required to be set.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A reading apparatus configured to read a plurality of colorimetric patches in different colors formed on a paper sheet and trigger patches formed so as to correspond to the colorimetric patches, comprising:
    a colorimeter configured to read the colorimetric patches formed on the paper sheet;
    a trigger sensor configured to read the trigger patches formed on the paper sheet; and
    a controller configured to control a reading region at which the colorimeter reads the colorimetric patch on the basis of the trigger patches read by the trigger sensor, wherein
    the controller has a colorimetry region determination mode in which the reading region at which the colorimeter reads the colorimetric patch is determined on the basis of reading results for the trigger patches and a colorimetry adjustment mode in which the reading region determined in the colorimetry region determination mode is controlled so as to be read by the colorimeter, and
    in the colorimetry region determination mode, after the reading regions for the colorimetric patches are set to states where the reading regions for the colorimetric patches are gradually shifted in a reading direction with respect to the respective reading results for the trigger patches, the reading results for the colorimetric patches by the colorimeter are collected and thereafter, a region for which a state consistent with a characteristic of the colorimetric patch has been obtained as the reading result is determined as the reading region.

2. The reading apparatus according to claim 1, wherein the controller distinguishes a mixed region where two different colorimetric patches have been read and an individual region where one colorimetric patch has been read from each other as the reading result for the respective colorimetric patches and then determines the individual region as the reading region.

3. The reading apparatus according to claim 2, wherein the controller gradually shifts the reading regions for the colorimetric patches in the reading direction with respect to the respective reading results for the trigger patches such that the reading regions for the colorimetric patches are put in the order of the mixed region, the individual region, and the mixed region as the reading results for the respective colorimetric patches and then determines the reading region at a state where the reading result is obtained as the individual region.

4. The reading apparatus according to claim 2, wherein the controller sets the reading regions for the colorimetric patches to states where the reading regions for the colorimetric patches are gradually shifted in the reading direction with respect to the respective reading results for the trigger patches such that the plurality of individual regions is successively generated as the reading results for the respective colorimetric patches and then determines the reading region from among the plurality of successive individual regions.

5. The reading apparatus according to claim 2, wherein the controller determines, as a center of the reading region, a center of a range where the individual regions are obtained as the reading results for the respective colorimetric patches.

6. The reading apparatus according to claim 1, wherein as an approach for setting the reading regions for the colorimetric patches to states where the reading regions for the colorimetric patches are gradually shifted in the reading direction with respect to the respective reading results for the trigger patches in the colorimetry region determination mode, when the plurality of colorimetric patches in different colors and the trigger patches formed so as to be synchronized with the colorimetric patches are formed on the paper sheet, the controller sets reading timings for the colorimetric patches by giving delay intervals different from one another to the respective reading results for the trigger patches.

7. The reading apparatus according to claim 1, wherein as an approach for setting the reading regions for the colorimetric patches to states where the reading regions for the colorimetric patches are gradually shifted in the reading direction with respect to the respective reading results for the trigger patches in the colorimetry region determination mode, when the plurality of colorimetric patches in different colors and the trigger patches formed such that phases thereof are gradually displaced with respect to the corresponding colorimetric patches are formed on the paper sheet, the controller sets reading timings for the colorimetric patches at a certain timing relative to the respective reading results for the trigger patches.

8. A reading control method for a case where a plurality of colorimetric patches in different colors formed on a paper sheet and trigger patches formed so as to correspond to the colorimetric patches are read by a reading apparatus, wherein the reading apparatus includes:

a colorimeter configured to read the colorimetric patches formed on the paper sheet;

a trigger sensor configured to read the trigger patches formed on the paper sheet; and a controller configured to control a reading region at which the colorimeter reads the colorimetric patch on the basis of the trigger patches read by the trigger sensor, the controller has a colorimetry region determination mode in which the reading region at which the colorimeter reads the colorimetric patch is determined on the basis of reading results for the trigger patches and a colorimetry adjustment mode in which the reading region determined in the colorimetry region determination mode is controlled so as to be read by the colorimeter, and in the colorimetry region determination mode, after the reading regions for the colorimetric patches are set to states where the reading regions for the colorimetric patches are gradually shifted in a reading direction with respect to the respective reading results for the trigger patches, the reading results for the colorimetric patches by the colorimeter are collected and thereafter, a region for which a state consistent with a characteristic of the colorimetric patch has been obtained as the reading result is determined as the reading region.

9. A non-transitory recording medium storing a computer readable reading control program configured to cause a computer in a reading apparatus to function in such a manner that a plurality of colorimetric patches in different colors formed on a paper sheet and trigger patches formed so as to correspond to the colorimetric patches are read by the reading apparatus, wherein the reading apparatus includes a colorimeter configured to read the colorimetric patches formed on the paper sheet, a trigger sensor configured to read the trigger patches formed on the paper sheet, and a controller configured to control a reading region at which the colorimeter reads the colorimetric patch on the basis of the trigger patches read by the trigger sensor, the reading control program includes a colorimetry region determination mode in which the reading region at which the colorimeter reads the colorimetric patch is determined on the basis of reading results for the trigger patches and a colorimetry adjustment mode in which the reading region determined in the colorimetry region determination mode is controlled so as to be read by the colorimeter, and the reading control program causes the computer in the reading apparatus to function in such a manner that, in the colorimetry region determination mode, after the reading regions for the colorimetric patches are set to states where the reading regions for the colorimetric patches are gradually shifted in a reading direction with respect to the respective reading results for the trigger patches, the reading results for the colorimetric patches by the colorimeter are collected and thereafter, a region for which a state consistent with a characteristic of the colorimetric patch has been obtained as the reading result is determined as the reading region.

* * * * *